United States Patent Office 2,758,477
Patented Aug. 14, 1956

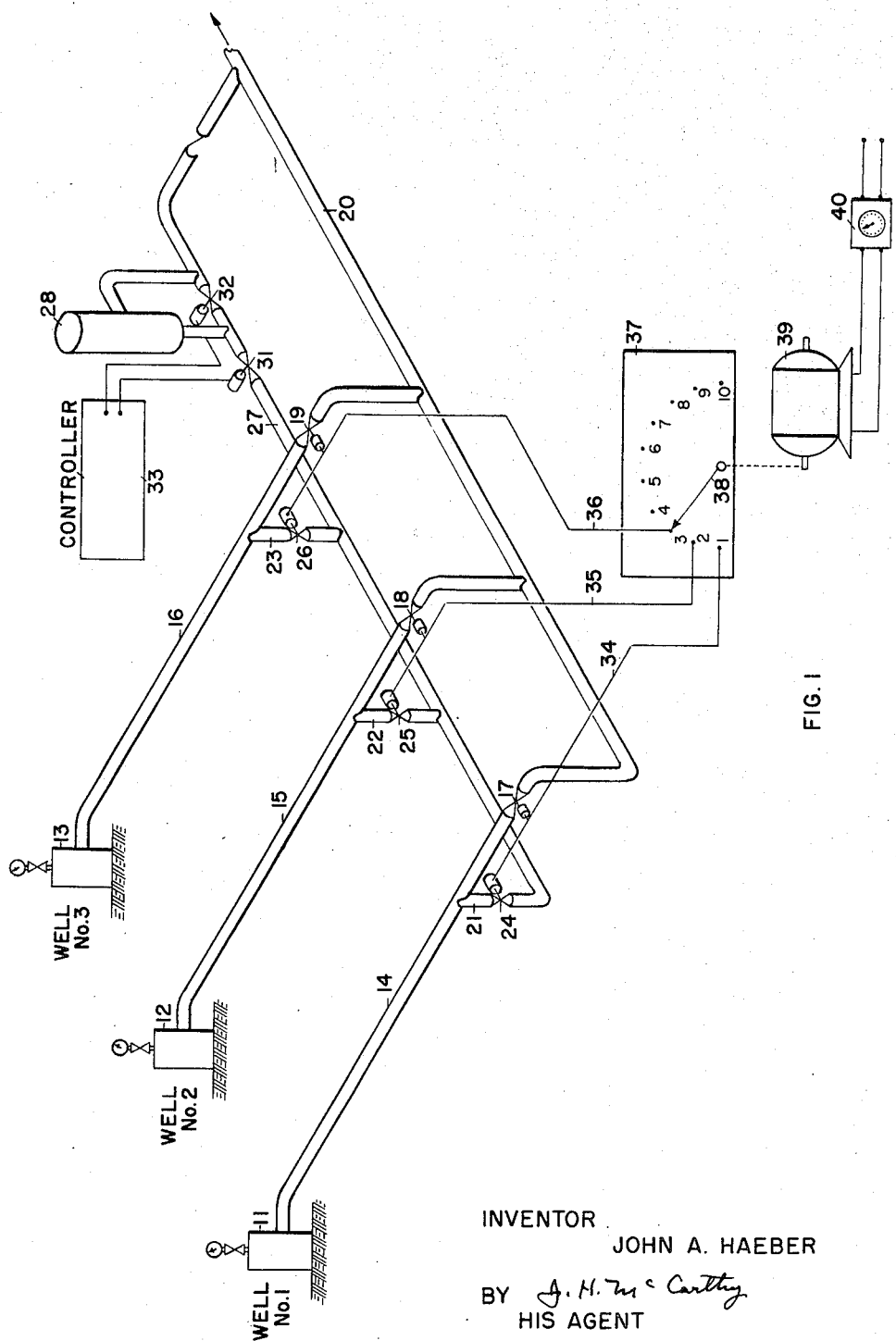

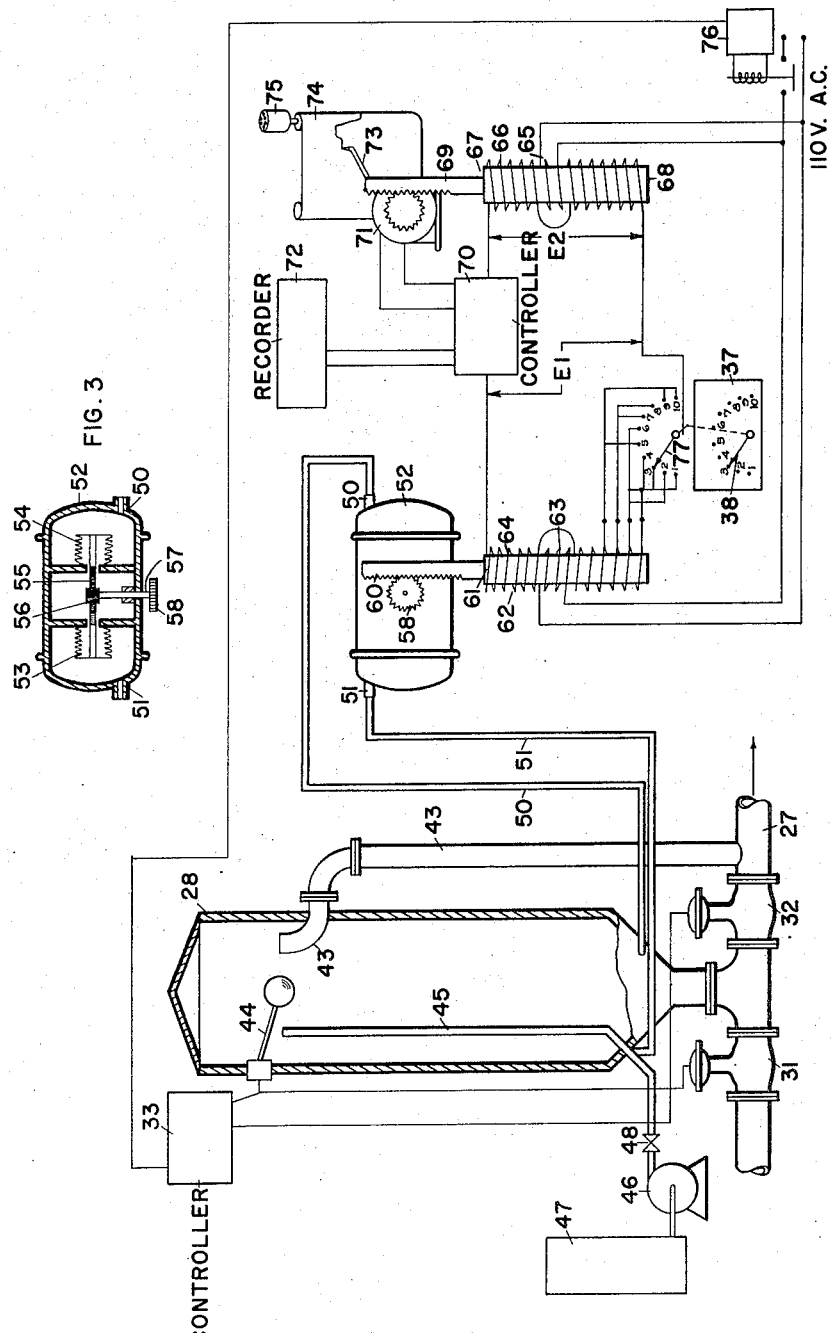

2,758,477

WATER CUT APPARATUS

John Albert Haeber, Ojai, Calif., assignor to Shell Development Company, New York, N. Y., a corporation of Delaware Application April 7, 1955, Serial No. 499,843

4 Claims. (Cl. 73—438)

This invention relates to apparatus for indicating and recording the amount of water in crude oil and pertains more particularly to an apparatus adapted to be located in an oil field for measuring the water-cut or water content in the production fluid coming from a plurality of oil wells.

For accounting purposes, it is often necessary to know the exact amount of production fluid produced by each individual oil well in a field daily. It is also necessary to know the percentage of water being produced by each well so that the daily production of oil from each well can be calculated. At present, this information can be obtained by running the production fluid from one well into a storage tank for a predetermined period and then having an operator gauge the amount of oil and water contained in the tank. Alternatively, an attempt is often made to secure this information by running the well production fluid through a separating unit to separate the water from the oil prior to measuring the amount of oil produced.

These and other methods used today in the oil fields possess one or more of the faults of being inaccurate due to inherent manual errors, expensive due to the equipment or the operator man hours involved, or unreliable due to the fact that the individual wells in an oil field often produce oils which may differ considerably in their specific gravity.

It is therefore a primary object of this invention to provide a water-cut apparatus for periodically indicating and recording the water content of crude oil flowing from each of a plurality of oil wells in a single field, even though the crude oil produced by the various wells may differ considerably in specific gravity.

Another object of this invention is to provide a water-cut apparatus for successively testing and recording the water-cut in the production fluid coming from a plurality of wells which are being automatically and consecutively tested on a predetermined schedule.

A further object of the present invention is to provide a water-cut recorder capable of sensing minute quantities of water in crude oil, whether said water is in a free state or is emulsified in said oil.

These and other objects of this invention will be understood from the following description of the invention particularly with reference to the drawings wherein:

Figure 1 is a diagrammatic view of a piping manifold of the present invention in communication with three wells in an oil field.

Figure 2 is a diagrammatic view, taken partly in cross-section, of a test tank installation comprising means for indicating and recording the amount of water present in crude oil passing through the test tank in accordance with the present invention.

Figure 3 is a plan view, taken in cross-section, of the hydraulic bellows unit shown in Figure 2.

Referring to Figure 1, three wellhead installations 11, 12 and 13, are shown as having production flow lines, 14, 15 and 16, in communication through control valves 17, 18, and 19 with a common pipeline 20 through which oil is pumped to suitable storage tanks (not shown), or to another pipeline for transfer to a distant refinery.

The individual flow lines 14, 15, and 16 from the wells 11, 12, and 13 are also in communication through by-pass lines 21, 22, and 23 and through control valves 24, 25, and 26 with a second conduit 27 leading to a water-cut test tank 28. The flow of fluid into and out of the test tank 28 is governed by control valves 31 and 32 which are actuated at predetermined time intervals by a suitable controller 33. The control valves employed by the present water-cut apparatus are all power-actuated valves of any type well known to the art and may be actuated either by hydraulic, pneumatic, electrical, or mechanical power means. Irrespective of the type of valves used, or the sources of power employed to operate them, all valves are of the type that may be electrically energized so as to be controlled by one or more electric circuits.

As diagrammatically illustrated in Figure 1 of the drawing, the control valves 17, 18, 19, 24, 25, and 26 are electrically-energized and electrically-operated valves of the solenoid type which are electrically connected through leads 34, 35, and 36 to suitable well selector switch means 37 of any suitable type, said well selector switch means being capable of handling any number of wells, say, from two to 100 or more. The movable contact 38 of the well selector switch means 37 is mechanically coupled to a motor 39 or other suitable means for periodically moving the contact arm 38 so as to operate the control valves on the piping manifold system in a manner such that the production fluid from one of the wells is directed through the test tank 28. The motor 39 is provided with time clock relay means 40 of a conventional type, which close the circuit periodically, say once every eight hours, to momentarily energize the motor 39 and move the contact 38 of the well selector switch means 37 to the next terminal. Control valves 17, 18, and 19 of the valve manifold are normally open so that all the production fluid from the wells is delivered to the pipeline 20. The controls 24, 25, and 26 in the by-pass lines 21, 22, and 23 are normally closed.

The test tank 28, as shown in Figure 2, may be provided with an overflow standpipe 43 which is in communication with the pipeline 27 downstream of the discharge valve 32. The test tank 28, which may be of any suitable size, say 60 barrels, is further provided with liquid level control means, for example, a float operated switch 44, for closing the inlet valve 31 after a predetermined quantity, say 50 barrels, of oil has been run into the tank.

Vertically mounted within the test tank 28 is a tubular standpipe 45 adapted to contain a column of fluid of known specific gravity, which wherever possible this fluid should be preferably of a higher specific gravity than the produced water and will be known hereinafter as the "standard fluid." A preferred type of standard fluid for oil field service is, for example, diethylene glycol which has a low volatility, is substantially unaffected by temperature changes between 40 and 110° F., and has a specific gravity close to that of oil. Since the tubular standpipe 45 is mounted within the tank 28 and hence surrounded by the oil in the tank, the temperature of the standard fluid within the standpipe and the oil in the tank is substantially the same. The open upper end of the standpipe 45 is preferably at a level just below the level of the fluid in the tank so as to compensate for any possible error in the liquid level control means 44. If the liquid level control means 44 is extremely accurate the top of the standpipe 45 may be at the level of the fluid in the tank, or slightly above.

Since the oil being delivered to the tank 28 may contain some gas, it may be necessary to equip the tank with vapor recovery systems to remove the vapors derived from the crude oil and thereby prevent the build-up of gas pressure in the tank 28 above the oil when a charge of oil has been delivered to the tank. These vapor recovery systems would control the tank pressures accurately at approximately 1/10" of water pressure above atmospheric pressure. However, since the top of standpipe 45 is open, the same pressure is exerted on the surface of the oil in the tank as on the top of the column of standard fluid in tube 45. In order to overcome evaporation losses of the standard fluid from the open top of the standpipe 45 and in order to remove scum or sludge from the top of the liquid column which forms and floats on the top of the column of standard fluid, it is necessary to add constantly a small amount of the standard fluid to the standpipe. This is done by connecting the bottom of the standpipe to a pump 46 which is in turn connected to a tank or reservoir 47 containing a supply of the diethylene glycol. The standard fluid is pumped through a needle valve 48 at a very small rate such as about one drop every five minutes which is sufficient to remove the sludge that collects on the top of the column of standard liquid in the standpipe 45. This minute quantity of standard fluid which mixes with the oil in the tank does not contaminate the crude oil being tested.

Small diameter pressure conduits or tubings 50 and 51 are tapped into the bottom of the test tank 28 and the standpipe 45, respectively. These pressure tubings 50 and 51 are connected into the opposite sides of a bellows unit 52.

As shown in Figure 3, the bellows unit 52 contains a pair of bellows 53 and 54. Suitable linkage means are provided, for example a rack rod 55 and gear means 56, for mechanically connecting the bellows 53 and 54 in opposition to turn a rotatable shaft 57 extending through the casing of the bellows unit 52. A pinion gear 58 is secured to the end of the shaft 57 extending outside the casing. As shown in Fig. 2 the pinion gear 58 engages and is adapted to move a rack 60 which is fixedly secured to the movable core 61 of a transformer 62.

The primary 63 and secondary 64 coils of the transformer 62 are each connected to the primary 65 and the secondary 66 coils, respectively, of a second transformer 67 which is also provided with a movable core 68 having a rack 69 fixedly secured thereto. The secondary coils 64 and 66 of the transformers 62 and 67 are connected to an electronic self-balancing circuit, for example a continuous-balance unit of a commercially well-known type such as a Brown "Electronik," which is adapted to drive a motor 71 geared to the rack 69 of the movable core 68. Any suitable type of recorder 72 may be connected to and driven by the controller 70. Alternatively, a pen arm 73 may be secured to the movable rack 69 so as to record movement of the core 68 on a chart 74 or other recording device which may be driven by a time clock motor 75.

The circuit is preferably provided with a time delay relay 76 so that the circuit is de-energized for a predetermined time say, five minutes, after the test tank 28 has been filled and while the fluid therein is being allowed to settle for five minutes. The transformers 62 and 67 are also connected together electrically through a gravity range selector switch 77. The gravity range selector switch 77 may be in the form of an electrical stepping switch as illustrated having a movable contact arm adapted to be moved to any one of a plurality of, in this case ten, terminals each corresponding to a particular well. As illustrated in Figure 2 of the drawing, the movable contact arm of the switch 77 is in contact with terminal 3 which, together with terminals 1, 4 and 6 of the switch, is electrically connected to the lowermost turn of the secondary coil of transformer 62 so that, for example in this case, the maximum secondary voltage of the transformer 62 is employed by the measuring system.

The setting of switch 77 corresponds to a particular specific gravity of the oil being produced by wells number 1, 3, 4 and 6 of a certain oil field. Since the specific gravity of the oil being produced by well number 2 is slightly different, the second terminal of the stepping switch 77 is electrically connected to another turn of the secondary coil of the transformer 62. Likewise, wells 7 and 8 produce an oil of a different specific gravity while wells 9 and 10 produce oil of still another specific gravity. Thus, these terminals 7 and 8, and the terminals 9 and 10, are electrically connected at other positions on the secondary coil of the transformer 62. By adjustment of the gravity range selector switch 77, the response of the measuring system for indicating a position of the movable core 61 in the transformer 62 when the system is connected to various wells of differing specific gravity, may be adjusted at will so as to provide a certain range for each well being tested. The gravity range selector switch 77 may be actuated either manually or by any suitable means, but is preferably mechanically or electrically connected to the well selector switch means 37 (also shown in Fig. 1) so as to be simultaneously actuated by said switch 37 in a manner described hereinbelow.

In the operation of the present system, oil of varying specific gravities is normally flowing at all times through the production flow lines 14, 15 and 16 through open valves 17, 18 and 19 into the main pipeline 20. Periodically, it is necessary to test the oil in each of the individual wells so as to determine the water content therein. For this purpose, the well selector switch 37 is automatically rotated by means of a time clock or other means in a well test sequence control mechanism 40 on a predetermined schedule so that a continuous cycle of well testing will occur regardless of the test duration of a particular well test.

Thus, when the movable arm 38 of the switch 37 is moved to terminal number 3, the normally opened valve 19 in flow line 16 is closed electrically while the normally closed valve 26 in by-pass line 23 is opened. This puts the flow of crude oil from well-head installation 13 into pipeline 27 from whence it flows through open valve 31 into the test tank 28, valve 32 being closed. After say, about 50 barrels of oil have been pumped into the test tank 28, the controller 33 shuts valve 31 and allows the oil in the test tank to settle for a five-minute interval before closing the time delay relay 76 (Fig. 4) to energize the measuring system.

While the test tank is being filled, the movable core 61 of transformer 62 is moved to a proper position by the rotating shaft 57 and pinion gear 58 of the differential pressure unit or bellows unit 52. The position of the shaft 55 and the amount of rotation of gear 58 is determined by the differential pressure being applied to the bellows 53 and 54 through tubings 51 and 50 from the column of standard fluid in standpipe 45 and the column of oil in the test tank 28, respectively. Thus, if the API gravity of fluid in the tank 28 is known, the water-cut, or the amount of water in the oil, can be determined from the differential pressure applied to the bellows unit 52.

When the five-minute settling period has been completed and switch 76 closed, power is applied across the primary coils 63 and 65 of the transformers 62 and 67 and voltages $E_1$ and $E_2$ are developed across the secondary coils 64 and 66. If $E_2$ is not equal to $E_1$, the electronic self-balancing unit 70, which is essentially a null-balancing servo-system, drives the balancing motor 71 in one direction or the other to force the movable core 68 of transformer 67 to such position that $E_2$ again equals $E_1$. The balancing motor 71 may also actuate either an electronic counter or a pen arm 73 to register or record the amount of water present in the oil in the tank 28. After the water-cut of the fluid has been recorded, discharge valve 32 (Figure 1) opens and the fluid in the tank is drained to the line 27.

When the movable arm 38 of the well selector switch 37 is subsequently moved to another terminal, another well is put on the test line 27 and fluid is run into the test tank 28. When the core 61 of the linear variable differential transformer 62 is moved, the voltage $E_1$ varies in magnitude proportionally to the movement of the core. This varying voltage is applied to an amplifier in the null balancing controller 70, and the amplifier furnishes to the balancing motor 71 a current of suitable polarity and intensity to move the movable core 68 in the transformer 67 so as to re-balance the system until $E_2$ again equals $E_1$.

The API gravity range selector switch 77 with its terminals or contacts wired to taps on the secondary coil of the transformer 62 is also actuated with the well selector switch 37. Thus, each new position of the switch 77 shifts the zero-cut reference point of the system and varies the turns ratio of the transformer 62. Hence, the voltage $E_1$ varies proportionately to the API cut of the fluid in the test tank 28. Tests which have been made for a number of months with the present system of checking the water-cut of oil of different gravities being produced by a plurality of wells indicate that the present system is a rapid method of obtaining these results.

The invention claimed is:

1. Apparatus for periodically indicating and recording the water content of crude oil flowing from a plurality of oil wells, said apparatus comprising a flow line from each of said wells to carry the crude oil to storage, a test tank for containing crude oil, by-pass conduit means in communication between said well lflow lines and the test tank, valve means in said flow lines and by-pass conduit means for connecting one by-pass conduit at a time to said test tank, inlet and outlet flow valves for filling and emptying said test tank, liquid level control means operatively connected to the inlet flow valve of said test tank for closing said inlet valve, a standpipe positioned vertically within said test tank adapted to contain a column of a standard fluid of known specific gravity, differential-pressure measuring means in communication on one side with the standard fluid in said standpipe and on the other side with the crude oil in said test tank, electrical circuit means mechanically linked to and adapted to be unbalanced by said differential-pressure measuring means, and well selector switch means for periodically and consecutively energizing the valve means in said flow line and by-pass conduit means from each of said oil wells to connect one well at a time to said test tank.

2. Apparatus for periodically indicating and recording the water content of crude oil flowing from a plurality of oil wells, said apparatus comprising a flow line from each of said wells to carry the crude oil to storage, a test tank for containing crude oil, by-pass conduit means in communication between said well flow lines and the test tank, valve means in said flow lines and by-pass conduit means for connecting one by-pass conduit at a time to said test tank, inlet and outlet flow valves for filling and emptying said test tank, liquid level control means operatively connected to the inlet flow valve of said test tank for closing said inlet valve, a standpipe positioned vertically within said test tank adapted to contain a column of a standard fluid of known specific gravity, differential-pressure measuring means in communication on one side with the standard fluid in said standpipe and on the other side with the crude oil in said test tank, electrical circuit means mechanically linked to and adapted to be unbalanced by said differential-pressure measuring means, said electrical circuit means containing gravity range selector means for altering said circuit means when fluids of differential specific gravity are run into said test tank, well selector switch means for periodically and consecutively energizing the valve means in said flow line and by-pass conduit means from each of said oil wells, and means operatively interconnecting said gravity range selector means and said well selector switch means for simultaneously actuating said gravity range selector means and said well selector switch means.

3. Apparatus for periodically indicating and recording the water content of crude oil flowing from a plurality of oil wells, said apparatus comprising a flow line from each of said wells to carry the crude oil to storage, a test tank for containing crude oil, said test tank having fluid inlet and discharge port means, by-pass conduit means in communication between said well flow lines and the test tank, valve means in said flow lines and by-pass conduit means for connecting one by-pass conduit at a time to said test tank, liquid level control means carried by said test tank maintaining the fluid level therein at a predetermined level, a standpipe positioned vertically within said test tank adapted to contain a column of a standard fluid of known specific gravity, the upper end of said standpipe being open and positioned substantially at the fluid level in said tank, differential-pressure measuring means in communication on one side with the standard fluid in said standpipe and on the other side with the crude oil in said test tank, electrical circuit means mechanically linked to and adapted to be unbalanced by said differential-pressure measuring means, said electrical circuit means containing gravity range selector means for altering said circuit means when fluids of different specific gravity are run into said test tank, well selector switch means for periodically and consecutively energizing the valve means in said flow line and by-pass conduit means from each of said oil wells, and means operatively interconnecting said gravity range selector means and said well selector switch means for simultaneously actuating said gravity range selector means and said well selector switch means.

4. Apparatus for periodically indicating and recording the water content of crude oil flowing from a plurality of oil wells, said apparatus comprising a flow line from each of said wells to carry the crude oil to storage, a test tank for containing crude oil, by-pass conduit means in communication between said well flow lines and the test tank, valve means in said flow lines and by-pass conduit means for connecting one by-pass conduit at a time to said test tank, inlet and outlet flow valves for filling and emptying said test tank, liquid level control means operatively connected to the inlet flow valve of said test tank for closing said inlet valve, a standpipe positioned vertically within said test tank adapted to contain a column of a standard fluid of known specific gravity, the upper end of said standpipe being open and positioned just below the fluid level in said test tank, a source of standard fluid to said standpipe to maintain the surface of said standard fluid free of contaminating materials, differential-pressure measuring means in communication on one side with the standard fluid in said standpipe and on the other side with the crude oil in said test tank, electrical circuit means mechanically linked to and adapted to be unbalanced by said differential-pressure measuring means, said electrical circuit means containing gravity range selector means for altering said circuit means when fluids of different specific gravity are run into said test tank, well selector switch means for periodically and consecutively energizing the valve means in said flow line and by-pass conduit means from each of said oil wells, and means operatively interconnecting said gravity range selector means and said well selector switch means for simultaneously actuating said gravity range selector means and said selector switch means.

References Cited in the file of this patent

UNITED STATES PATENTS

| 2,415,886 | Jones et al. | Feb. 18, 1947 |
| 2,652,846 | Dunn | Sept. 22, 1953 |
| 2,659,390 | MacLea et al. | Nov. 17, 1953 |

FOREIGN PATENTS

| 498,630 | Great Britain | Jan. 11, 1939 |